United States Patent
Yajima et al.

(10) Patent No.: US 8,060,769 B2
(45) Date of Patent: Nov. 15, 2011

(54) DUPLEXED FIELD CONTROLLER

(75) Inventors: Hideharu Yajima, Tokyo (JP); Satoshi Kitamura, Tokyo (JP); Senji Watanabe, Tokyo (JP); Masafumi Kisa, Tokyo (JP); Kazushi Sakamoto, Tokyo (JP); Hiroyuki Takizawa, Tokyo (JP); Kuniharu Akabane, Tokyo (JP); Yoshinori Kobayashi, Tokyo (JP); Kenji Habaguchi, Tokyo (JP); Kiyotaka Kozakai, Tokyo (JP); Mitsuhiro Kurono, Tokyo (JP); Hiroaki Nakajima, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 70 days.

(21) Appl. No.: 12/700,148

(22) Filed: Feb. 4, 2010

(65) Prior Publication Data

US 2010/0198991 A1 Aug. 5, 2010

(30) Foreign Application Priority Data

Feb. 5, 2009 (JP) .................................. 2009-025122

(51) Int. Cl.
*G06F 1/04* (2006.01)
*G06F 1/12* (2006.01)
*G06F 15/16* (2006.01)

(52) U.S. Cl. ......... 713/375; 713/400; 713/503; 713/600

(58) Field of Classification Search ................... 713/375, 713/400, 503, 600

See application file for complete search history.

(56) References Cited

U.S. PATENT DOCUMENTS

| | | | |
|---|---|---|---|
| 4,674,036 A | 6/1987 | Conforti | |
| 5,918,040 A * | 6/1999 | Jarvis | 713/375 |
| 6,633,989 B1 * | 10/2003 | Hollins | 713/400 |
| 6,832,326 B2 * | 12/2004 | Kubo et al. | 713/400 |
| 7,058,838 B2 * | 6/2006 | Xu | 713/400 |
| 2002/0019951 A1 * | 2/2002 | Kubo et al. | 713/400 |
| 2004/0117682 A1 * | 6/2004 | Xu | 713/400 |
| 2008/0031283 A1 * | 2/2008 | Curran-Gray et al. | 370/503 |
| 2010/0058095 A1 * | 3/2010 | Malek | 713/375 |

FOREIGN PATENT DOCUMENTS

| | | |
|---|---|---|
| DE | 19625195 A1 | 1/1998 |
| EP | 0 316 087 A2 | 5/1989 |
| JP | 11-178217 A | 7/1999 |
| JP | 2006-185308 A | 7/2006 |
| JP | 2006-276958 A | 10/2006 |

OTHER PUBLICATIONS

European Search Report dated Mar. 2, 2011, issued in corresponding European Patent Application No. 10152720.8.

* cited by examiner

*Primary Examiner* — Thomas Lee
*Assistant Examiner* — Jaweed A Abbaszadeh
(74) *Attorney, Agent, or Firm* — Westerman, Hattori, Daniels & Adrian, LLP

(57) ABSTRACT

There is provided a duplexed field controller. The duplexed field controller includes: first and second control units between which a control authority is switchable; a first application clock that is updated based on a reference clock so as to define a timing of an application operation of the first control unit; a second application clock that is updated based on the reference clock so as to define a timing of an application operation of the second control unit; and an update control unit that bypasses the first update of the second application clock after switching of the control authority, if the first application clock is ahead of the second application clock when the control authority is switched from the first control unit to the second control unit.

4 Claims, 5 Drawing Sheets

DUPLEXED FIELD CONTROLLER

This application claims priority from Japanese Patent Application No. 2009-025122, filed on Feb. 5, 2009, the entire contents of which are incorporated by reference herein.

BACKGROUND OF THE INVENTION

1. Technical Field

The present disclosure relates to a duplexed field controller. More particularly, the present disclosure relates to a duplexed field controller having two control units between which the control authority is switchable.

2. Related Art

According to a field controller in the related art, the same processing is simultaneously executed using two CPUs between which the control authority is switchable. When an abnormality occurs at a control side CPU, the control authority is shifted to a standby side CPU. With such duplexing CPU, the reliability of control can be significantly improved (see e.g., JP-A-2006-276958).

Also, in the duplexed field controller, since the continuity of control is required even at the switching of the control authority, it is desired to minimize the time during which control is intermitted. Moreover, the increasing control scan speed can be handled by smoothing the switching of the control authority.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a duplexed field controller capable of smoothly switching the control authority.

According to one or more illustrative aspects of the present invention, there is provided a duplexed field controller. The duplexed field controller includes: first and second control units between which a control authority is switchable; a first application clock that is updated based on a reference clock so as to define a timing of an application operation of the first control unit; a second application clock that is updated based on the reference clock so as to define a timing of an application operation of the second control unit; and an update control unit that bypasses the first update of the second application clock after switching of the control authority, if the first application clock is ahead of the second application clock when the control authority is switched from the first control unit to the second control unit.

Other aspects of the invention will be apparent from the following description, the drawings and the claims.

DETAILED DESCRIPTION OF EXEMPLARY EMBODIMENTS

Hereinafter, an exemplary embodiment of the duplexed field controller according to the present invention will be now described with reference to FIGS. 1 to 4.

Figure 1:
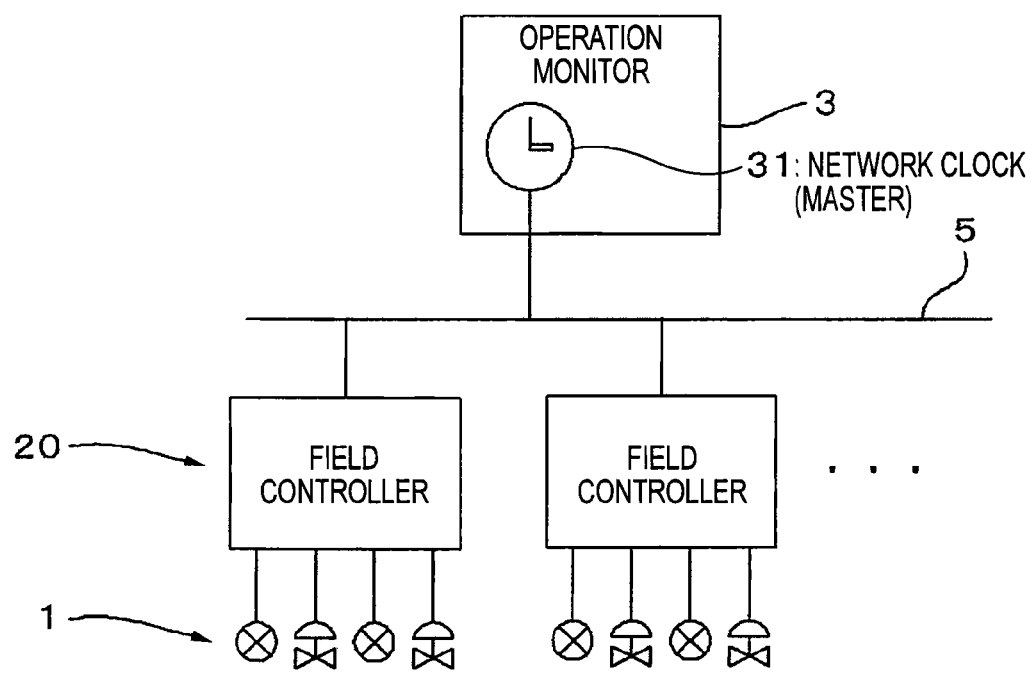
FIG. 1 is a block diagram showing the configuration of a distributed control system using a duplexed field controller according to an embodiment of the invention.
Figure 2:
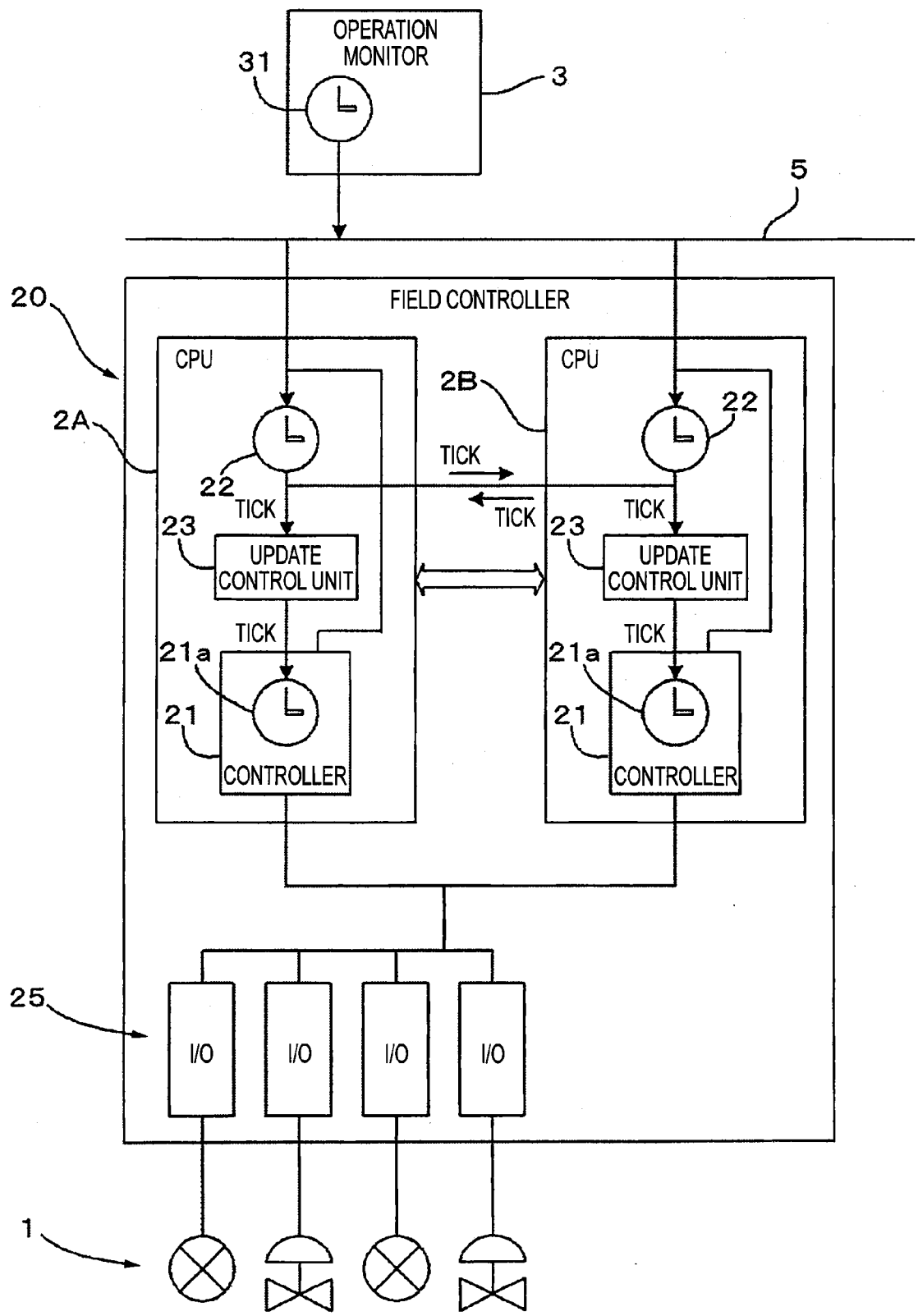
FIG. 2 is a block diagram functionally showing the configuration of a field controller serving as the duplexed field controller according to the present embodiment.

FIG. 1 is a block diagram showing the configuration of a distributed control system using the duplexed field controller of the present embodiment. FIG. 2 is a block diagram functionally showing the configuration of a field controller serving as the duplexed field controller of the present embodiment.

As shown in FIG. 1, the distributed control system includes: field controllers 20 disposed in a plant in a distributed manner; and an operation monitor 3 for operating and monitoring a field device group 1 in the plant through the field controllers 20. The field controllers 20 and the operation monitor 3 are connected to each other via a control network 5.

The operation monitor 3 is provided with a network clock 31 that defines the network time of the control network 5. All the devices connected to the control network 5 execute control processing according to the network time defined by the network clock 31.

As shown in FIG. 2, the field controllers 20 are provided with a CPU 2A and a CPU 2B that execute the same processing in synchronism. The CPU 2A and the CPU 2B each include: a control unit 21 that executes an application for control; a network clock 22 that indicates the network time obtained through the control network 5; a update control unit 23 for controlling the advance of an application clock 21a described later.

The control unit 21 is provided with the application clock 21a that defines the execution timing of the application. The application clock 21a is updated by receiving a timer clock (Tick) generated by the network clock 22. The control side CPU updates the application clock 21a based on the timer clock (Tick) generated by its own network clock 22. The timer clock (Tick) is transferred from the control side CPU to the standby side CPU, and the standby side CPU updates the application clock 21a based on the timer clock (Tick) transferred from the control side. With such a procedure, controls at the CPU 2A and the CPU 2B and communications between the CPUs (a communication for data exchange, a communication for abnormality detection by verification or the like) are synchronized.

Figure 3:
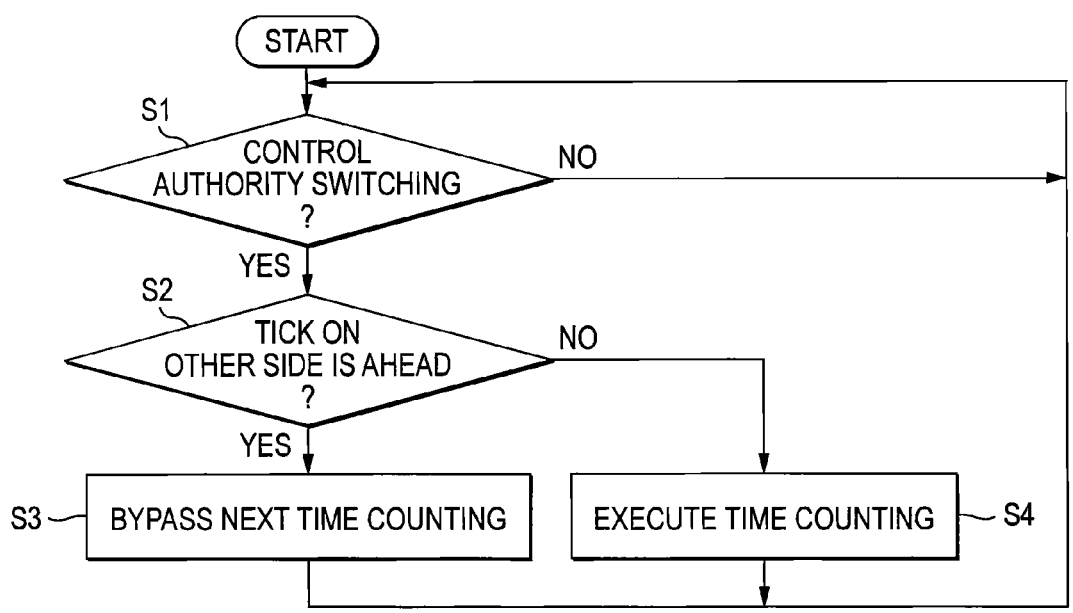
FIG. 3 is a flowchart showing the operation of update control unit.
Figure 4A:
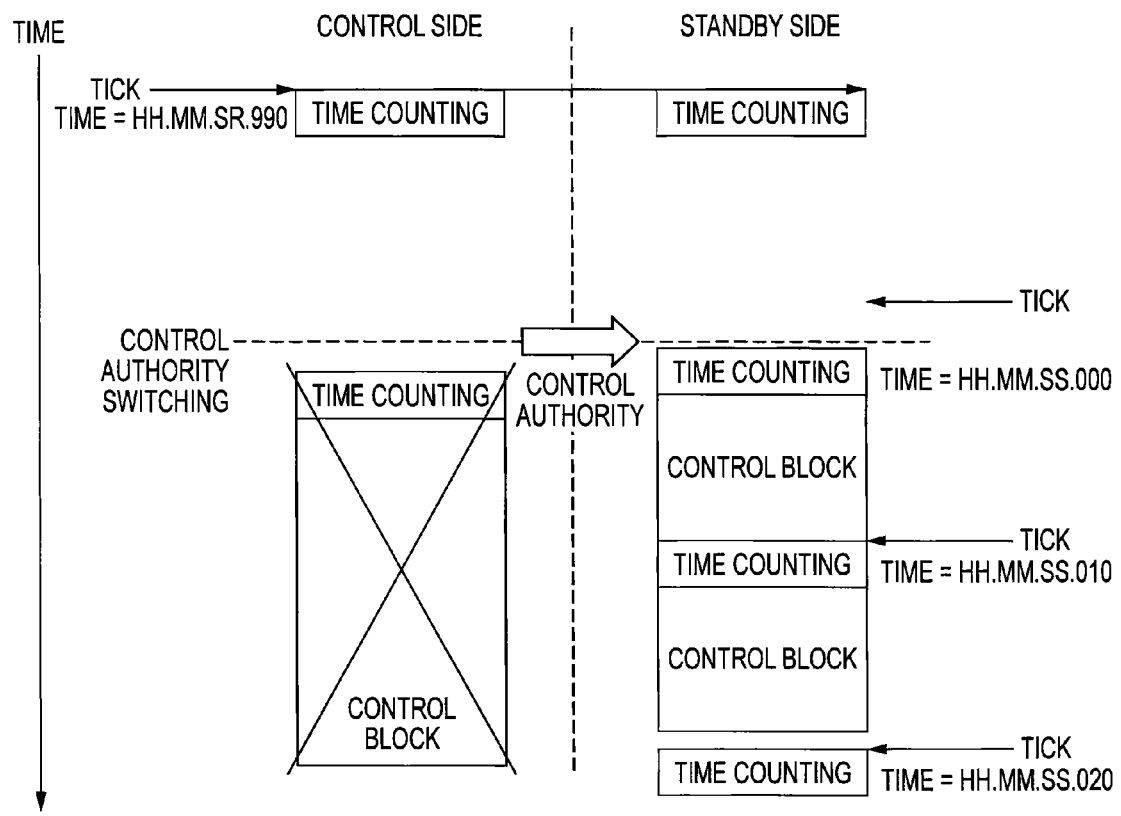
FIGS. 4A and 4B are timing charts showing the operation to update an application clock when the control authority is switched.
Figure 4B:
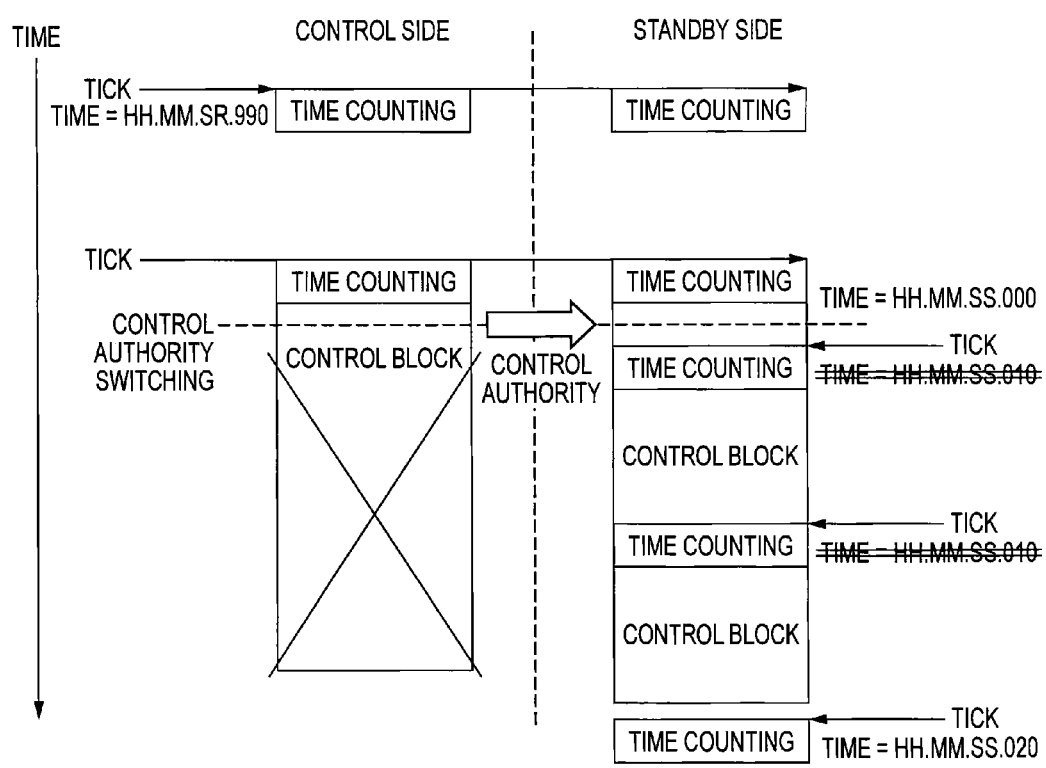

FIG. 3 is a flowchart showing the operation of the update control unit 23. FIGS. 4A and 4B are timing charts showing the operation to update the application clock 21a when the control authority is switched.

In FIG. 3, steps S1 to S4 show the operation on the CPU side which is newly provided with the control authority by the switching of the control authority. For example, when the control authority is shifted from the CPU 2A to the CPU 2B, this processing corresponds to the operation of the update control unit 23 of the CPU 2B. In the following description, assume that the CPU 2B is provided with the control authority, and the operation of the update control unit 23 of the CPU 2B will be now described.

At step S1 of FIG. 3, the update control unit 23 waits for the occurrence of the switching of the control authority. If YES, the process goes to step S2.

At step S2, it is determined whether the timer clock (Tick) of the CPU 2A is ahead of the timer clock (Tick) of the CPU 2B or not. If YES, the process goes to step S3. On the other hand, if NO, the process goes to step S4.

At step S3, time counting for the next timer clock (Tick) is bypassed, and the process returns to step S1.

On the other hand, at step S4, the application clock 21a is updated by time counting, and the process returns to step S1.

FIG. 4A shows the operation when the result of the determination of step S2 is "NO". In this case, as shown in FIG. 4A, since the timer clock (Tick) of the CPU 2B is ahead of the timer clock (Tick) of the CPU 2A, there is a possibility that the timing of the timer clock (Tick) of the CPU 2B has already been passed at the point of time of the switching of the control authority. Therefore, counting omission can be prevented by executing time counting after the switching of the control authority and setting the time of the application clock 21a to "HH.MM.SS.000".

On the other hand, FIG. 4B shows the operation when the result of the determination of step S2 is "YES". In this case, as shown in FIG. 4B, the timer clock (Tick) of the CPU 2A is ahead of the timer clock (Tick) of the CPU 2B. For this reason, there is a possibility that the time of the application clock 21a has been counted up (updated) to "HH.MM.SS.000" by the timer clock (Tick) from the CPU 2A at the time of the switching of the control authority. Therefore, double counting can be prevented by not performing time counting for one timer clock (Tick) by bypassing the next timer clock (Tick) of the CPU 2B.

With the above-described control, counting omission and double counting of the application clock can be prevented. Therefore, the accuracy of the application clock can be improved from the jitter corresponding to the cycle (for example, 10 ms) of the timer clock (Tick) to an accuracy (for example, about ±2 ms) equal to that of the network clocks of the CPUs.

For example, when the cycle of the control scan is about 50 ms, the scan jitter is about ±2 ms (=±4%), and the influence on the controllability can be suppressed by reduction in jitter.

Moreover, even in the case of a control cycle whose scan cycle is about 10 ms which is equal to the cycle of the timer clock (Tick), scan cycle omission can be prevented. Consequently, control with such a short scan cycle is possible.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. The duplexed field controller including first and second control units between which a control authority is switchable, the controller characterized by comprising;
   a first application clock that is updated based on a reference clock so as to define a timing of an application operation of the first control unit;
   a second application clock that is updated based on the reference clock so as to define a timing of an application operation of the second control unit; and
   an update control unit that bypasses the first update of the second application clock that is based on the reference clock after switching of the control authority, if the first application clock is ahead of the second application clock when the control authority is switched from the first control unit to the second control unit,
   characterized in that the reference clock is transferred from a control-side control unit of one of the first and second control units to a standby-side control unit of the other of the first and second control units, and the standby side control unit updates the application clock based on the transferred reference clock.

2. The duplexed field controller according to claim 1, characterized in that the update control unit updates the second application clock, if the first application clock is behind the second application clock when the control authority is switched from the first control unit to the second control unit.

3. The duplexed field controller including first and second control units between which a control authority is switchable, the controller characterized by comprising;
   a first application clock that is updated based on a reference clock so as to define a timing of an application operation of the first control unit;
   a second application clock that is updated based on the reference clock so as to define a timing of an application operation of the second control unit; and
an update control unit that bypasses the first update of the second application clock that is based on the reference clock after switching of the control authority, if the first application clock is ahead of the second application clock when the control authority is switched from the first control unit to the second control unit,
   wherein the reference clock is a network clock common in a control network to which the duplexed field controller is connected.

4. The duplexed field controller according to claim 3, characterized in that the update control unit updates the second application clock, if the first application clock is behind the second application clock when the control authority is switched from the first control unit to the second control unit.

* * * * *